F. Ortlieb,
Rotary Steam Engine.
No. 71,208. Patented Nov. 19, 1867.

Inventor
M Coombs
A Leclerq

Inventor
F. Ortlieb

F. Ortlieb,
Rotary Steam Engine.

No. 71,208.   Patented Nov. 19, 1867.

Witnesses

Inventor

F. Ortlieb,
Rotary Steam Engine.

N° 71,208.                                    Patented Nov. 19, 1867.

Witnesses:                                    Inventor:

F. Ortlieb,
Rotary Steam Engine.

No. 71,208. Patented Nov. 19, 1867.

Witnesses:

Inventor:

F. Ortlieb,
Rotary Steam Engine,
No. 71,208. Patented Nov. 19, 1867.
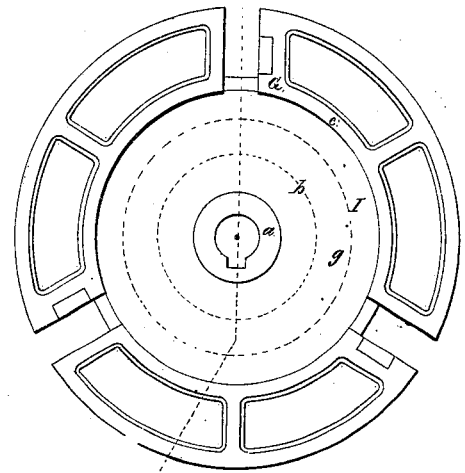
Fig. 12.
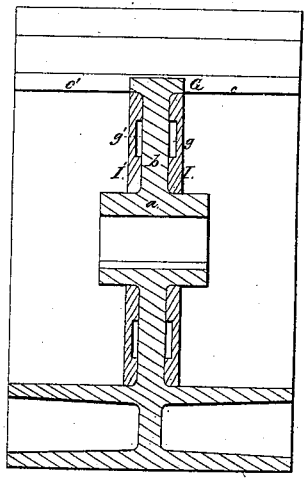
Fig. 13.
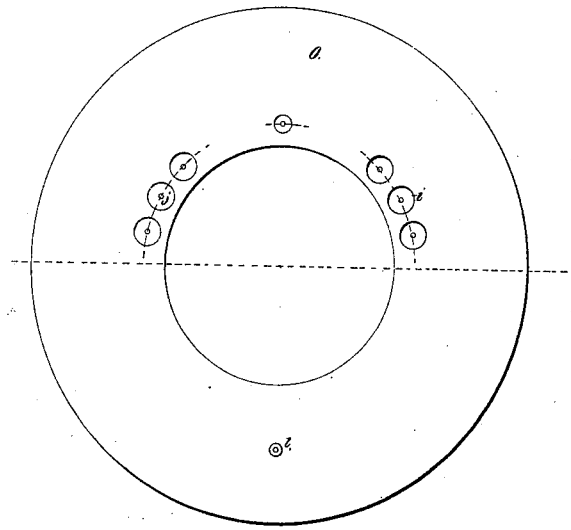
Fig. 15.
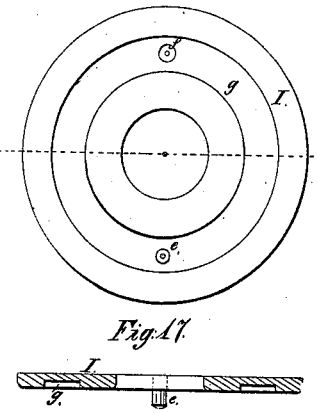
Fig. 16.
Fig. 14.
Fig. 17.
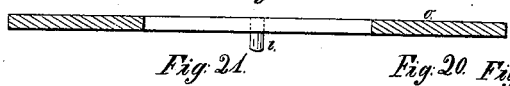
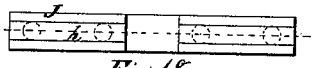
Fig. 19.
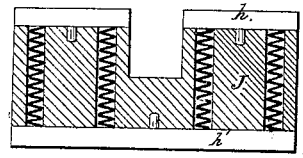
Fig. 21.
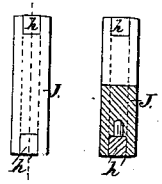
Fig. 20. Fig. 22.
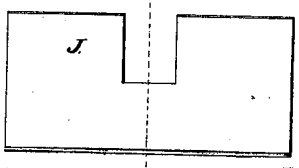
Fig. 18.
Witnesses:
Inventor:

United States Patent Office.

FREDERICK ORTLIEB, OF WILLIAMSBURG, NEW YORK, ASSIGNOR TO THE METROPOLITAN ROTARY ENGINE COMPANY, OF NEW YORK.

Letters Patent No. 71,208, dated November 19, 1867.

IMPROVEMENT IN ROTARY ENGINES.

The Schedule referred to in these Letters Patent and making part of the same.

TO ALL WHOM IT MAY CONCERN:

Be it known that I, FREDERICK ORTLIEB, of Williamsburg, Brooklyn, in the county of Kings, and State of New York, have invented a new and useful Improvement in Rotary Engines, of which the following is a full, clear, and exact description, reference being had to the accompanying drawings forming part of this specification, and in which—

Figure 1:
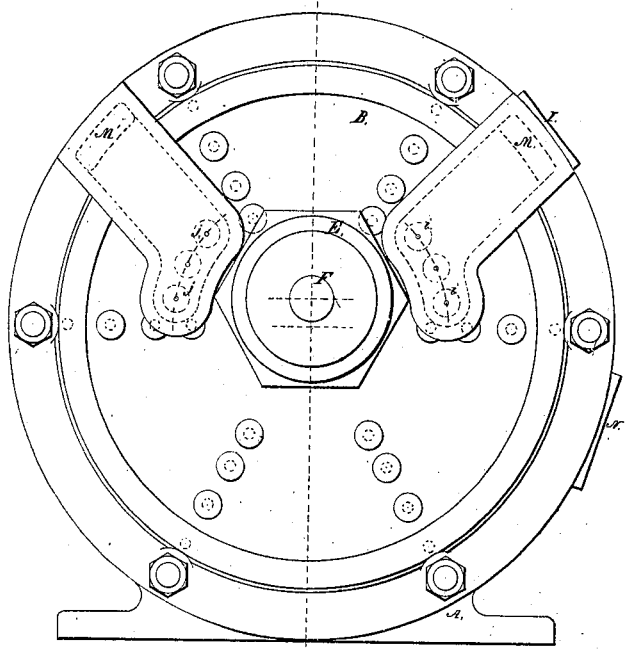

Figure 1 represents a front or side view of a rotary engine, constructed according to my invention.

Figure 2:
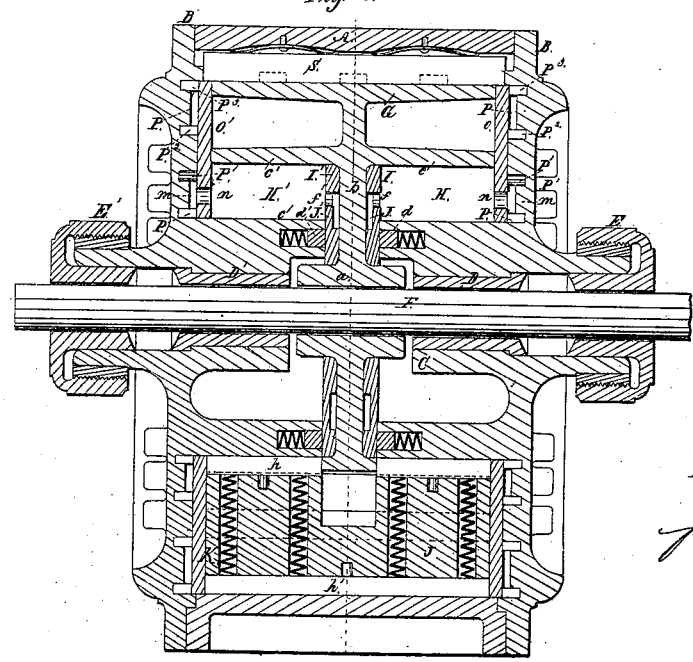

Figure 2, a transverse section of the same, taken as denoted by the line $x.x$ in fig. 1.

Figure 3:
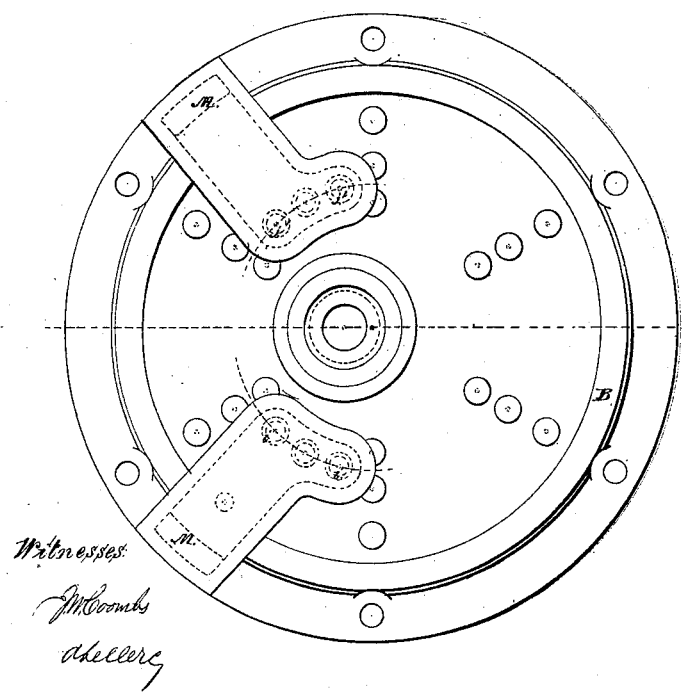

Figure 3, an exterior face view of one of the cylinder-covers.

Figure 4:
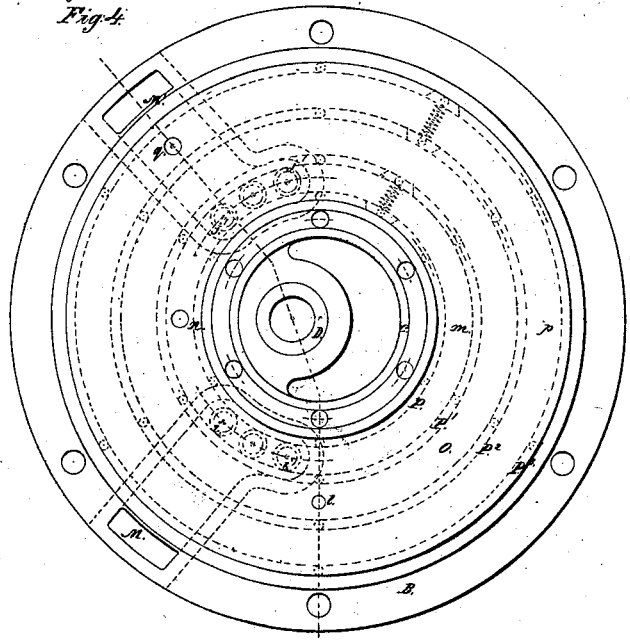

Figure 4, an interior face view of the same.

Figure 5:
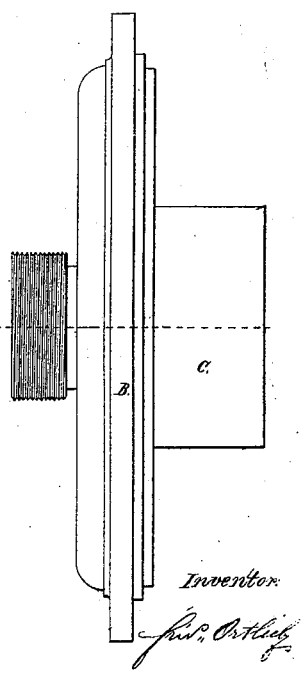

Figure 5, an edge view thereof, and

Figure 6:
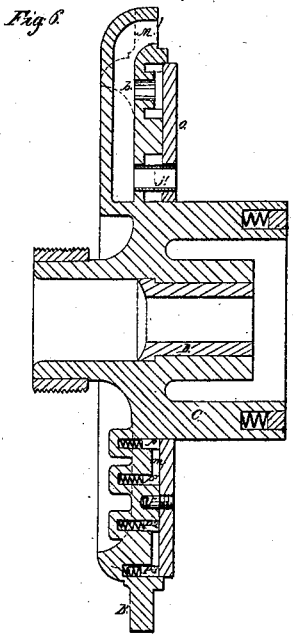

Figure 6 a section through the line $y\ y$, in fig. 4.

Figure 7:
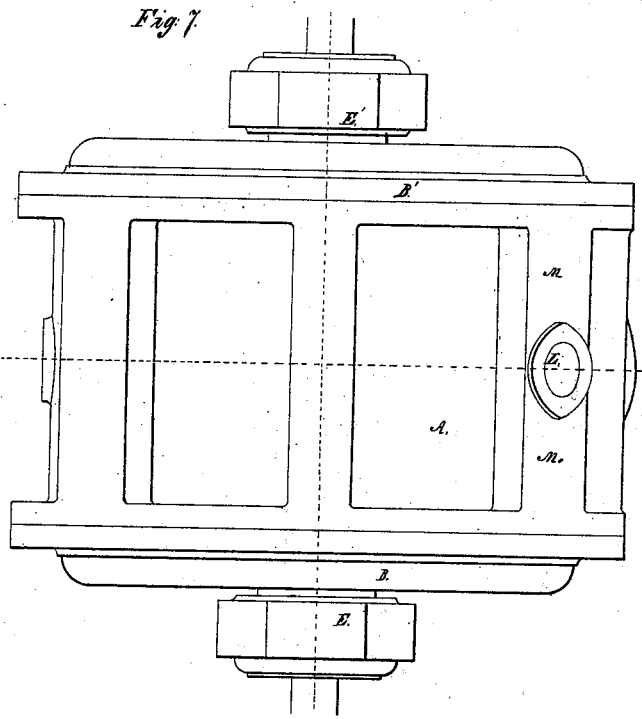

Figure 7 represents a plan view of the engine, and

Figure 8:
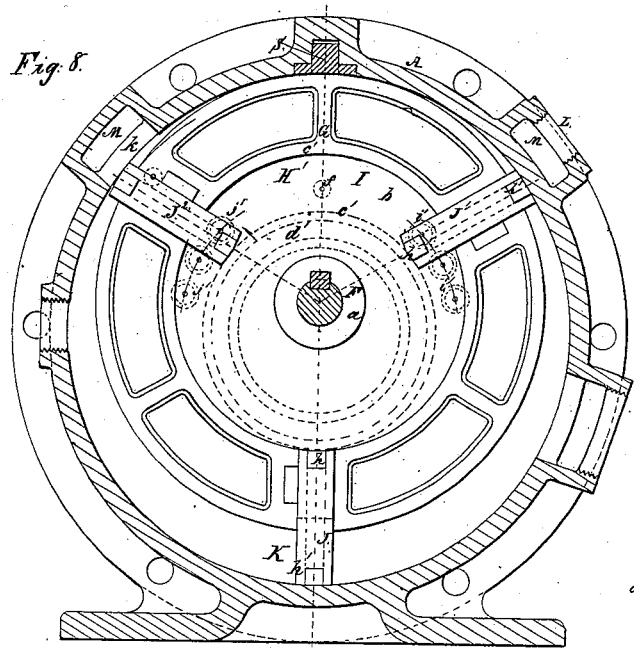

Figure 8 a section of the same, at right angles to fig. 2.

Figure 9:
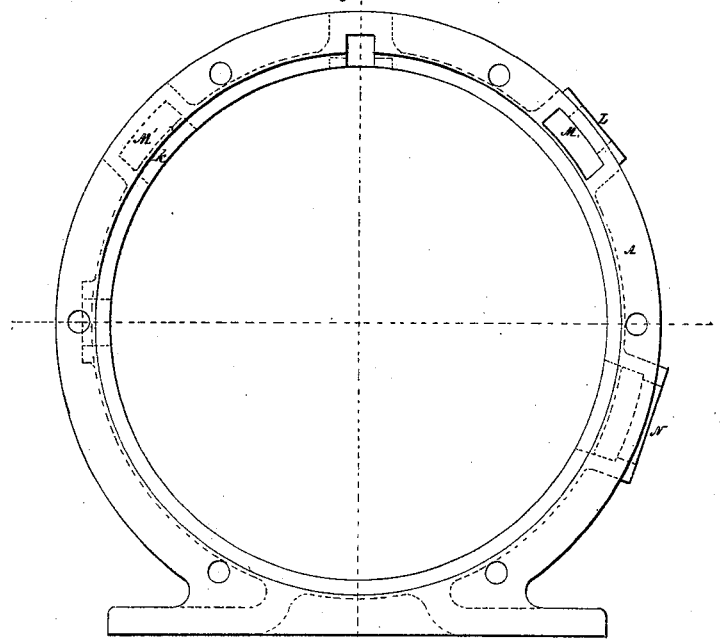

Figure 9 is a side view of the engine-cylinder, with the covers removed, and

Figure 10:
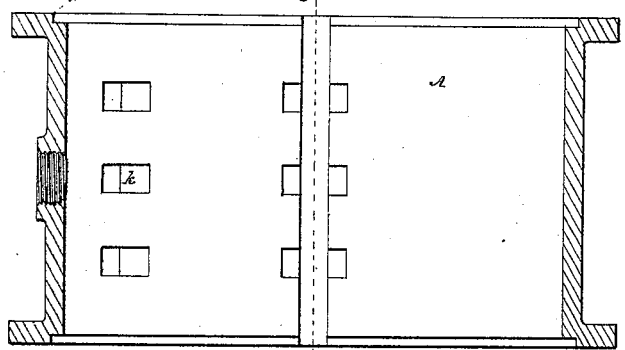
Figure 11:
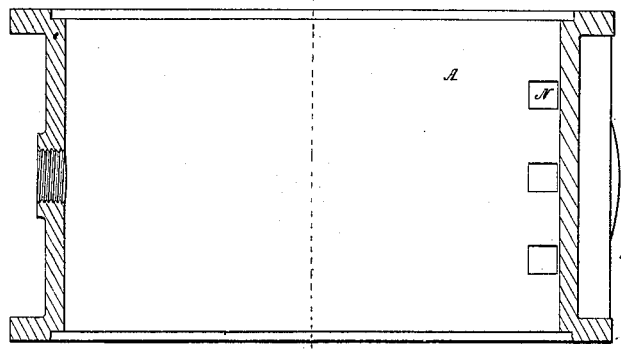

Figures 10 and 11 transverse sections thereof, the one showing the upper and the other the lower halves or portions thereof.

Figure 12 represents a face view of the engine-piston or revolving cylinder, with its radial arms or slides removed.

Figure 13, a transverse section thereof, with its balance-plates.

Figure 14, a face view of one of the large balance-plates which fit within the ends of the cylinder.

Figure 15 a transverse section of the same, and

Figures 16 and 17 similar views of one of the small balance-plates connected with the piston.

Figures 18, 19, 20, 21, and 22 are side, edge, end views, and longitudinal and transverse sections of one of the radial slides carried by the piston or revolving cylinder.

Similar letters of reference indicate corresponding parts throughout the several figures.

My improvement has reference to that class of rotary engines which employ a revolving piston, made up of or carrying radial slides, and, together with the driving-shaft to which it is secured, occupying an eccentric position relatively to the engine cylinder; and my invention consists, firstly, in a novel construction or combination of parts, involving or constituting a new mode of applying or using the steam, first at a high pressure on a short piston leverage, and afterwards expansively at a lower pressure on a longer piston leverage, in such manner as to counteract lateral thrust or strain on the piston or engine-shaft by pressure of the steam on the periphery of the piston or rotating cylinder carrying the radial slides. Said invention also consists in a combination of parts and disposition of ports for thus using the steam, whereby the piston itself, or radial slides thereof, serve, without the aid of valves, to control not only the inlet and exhaust or final escape of the steam, but also its passage after being utilized in a high-pressure form to work expansively in a separate cylinder or chamber upon or in connection with one and the same piston. And said invention further consists in a combination of steam-balance plates and packing-rings, in connection with ports controlled by the radial slides for keeping steam-tight, with but little or no friction, the edges of the latter and ends of the rotating piston or cylinder carrying the slides. Furthermore, the invention consists in such a disposition of inner and outer cylinders or chambers and piston with its slides working therein relatively to the exhaust, as that, in condensing the expanded steam, the cooling effect thereby produced will be confined to a limited portion only of the outer cylinder or case, without subjecting the inner or high-pressure cylinder thereto.

Referring to the accompanying drawing, A represents an outer cylinder or case, and B B' its lids or covers, which are constructed to project internally at their centres, as by cylindrical formations C C', that are bored or formed with tubular passages through them and their lids or covers in directions which are eccentric to but parallel with the axis of the cylinder A, for reception of bushes D D', and stuffing-boxes or glands E E', within and through which the rotating, driving, or piston-shaft F works. The piston or revolving cylinder, G, carrying the radial slides, is made up of a hub, *a*, by which it is secured to the shaft F, centrally dividing-disk or plate *b*, and inner ring or periphery *c c'*, forming, in connection with the cylindrical formations C C', interior steam-spaces, chambers, or cylinders H H'. The ends of the cylindrical formations C C' are furnished with spring-borne packing-rings *d d'*, which bear or press against steam-balance plates or disks I I', arranged to face or lie against and cover either side of the dividing-disk *b*, between the hub *a* and inner ring or periphery *c c'* of the piston. These balance-plates I I' are geared with the dividing-disk *b* by steady-pins, *e*, so as to rotate with the piston, but otherwise are loose or free to play longitudinally in relation to the shaft F, being in a manner balanced, as it were, and pressed outwards by steam entering from and of the same pressure as in the cylinders H H', through apertures *f f'*, communicating with cavities *g g* in the backs of said plates, to pack in a steam-tight but free manner the inner edges of the radial slides J $J^1$ $J^2$, for the lower portion of their lengths within the cylinders or chambers H H', in their radial and rotary actions, and serving, in connection with the packing-rings *d d'*, to prevent leakage generally past the lower ends or portion of the piston, carrying the independent slides J $J^1$ $J^2$ in the chambers H H', on opposite sides of the dividing-disk *b*. These slides, consisting, as here shown, of three, disposed at an equal distance apart, are or may be fitted with the usual end-packings *h h'*, forced out by springs, and are made to slide freely through recesses in the revolving piston or cylinder G, the eccentric position of which, relatively to the stationary cylinder A, forms between the outer periphery of said revolving cylinder and inner periphery of the stationary one a steam-cylinder, space, or chamber, K, within which the radial slides J $J^1$ $J^2$ also play, and in which the steam, after it has done duty at a high pressure in the cylinders or chambers H H', is made to work expansively to impel or rotate the piston. This I effect in a peculiar manner, and without the aid of valves or complicated gear for cutting off the influx of high-pressure steam to the inner cylinder or cylinders, and regulating its passage to the outer cylinder, and after having performed its duty there, discharge from the same to the condenser or otherwise, and so that the high-pressure steam which acts upon the short leverage of the piston is aided by an equal force, or thereabouts, on the longer leverage by the expanded steam and lateral pressure thrown upon the shaft F by the high-pressure steam acting on the inner periphery *c c'* of the piston is counteracted by the expanded or low-pressure steam in the cylinder K in its action on the outer periphery of the piston or revolving cylinder G, the areas or proportions of the cylinders H H' and K being suitably regulated for such purpose, as is also the timely supply of high and low-pressure steam to act simultaneously in opposite radial directions, as described, upon the revolving piston or cylinder G. Thus, for instance, high-pressure steam is introduced by an inlet, L, branch ways or passages M, and tubular passages *i i*, into the cylinders or chambers H H'. The live steam, thus admitted, acts upon one of the radial slides on both sides of the piston-dividing disk, and causes the piston to move around or continues its pressure on the lower portion of said slide, till, in the rotation of the piston, tubular passages *j j'* are uncovered in the rear of said slide by the passage of the latter over them, for escape of such high-pressure steam into ways M', from whence it enters by a port or ports, *k*, into the outer steam-chamber K, where it is caused to act expansively on the longer leverage of the piston or radial slide exposed to it. The position of one of the three piston-slides is such as always to receive the impulse of the live steam passing from the inner cylinder, which continues to work expansively until it is allowed to escape into the atmosphere or condenser through a final exhaust-port or ports, N.

From this description, and by reference to the annexed drawings, it will be seen that the high-pressure steam acts on a short lever, while the expanded steam acts on a proportionately longer lever; also, that a counteracting pressure is induced upon the inner and outer peripheries of the revolving piston or cylinder G, which obviates or reduces lateral strain or pressure on the engine-shaft F. And it will further be seen, that by the disposition of the high and low-pressure cylinders, open to the action of a common piston, and arrangement of the ports or passages, the condenser (where the engine is a condensing one) can never affect or exercise a detrimental cooling effect upon the high-pressure cylinder, nor yet, where a triplicate arrangement of radial slides is used, upon more than one-third or thereabouts of the outer cylinder.

As before observed, it will likewise be seen that although the engine is a perfect high-pressure and expanding condensing engine, the usual steam and cut-off valves used in other engines are entirely dispensed with, the radial slides performing the alternate duties of pistons, steam and cut-off valves without the interposition of further mechanism.

In addition to the small balance-plates I I' to the interior edges of the divided piston, there are also larger and outer steam-balance plates O O', fitted partially into each cylinder-head or cover B B', and made to enter the ends of the cylinder A, to form a steam-tight joint to the outer edges of the piston. Behind each of these balance-plates O O', which serve to pack the radial slides throughout their entire lengths, are packing-rings P $P^1$ and $P^2$ $P^3$, fitted steam-tight into each cylinder-head or cover in such manner as to allow motion only in the direction of or towards the balance-plates, which, as well as the packing-rings, are prevented from rotating by steady-pins *l*. Between the two inside packing-rings P $P^1$, on either side of the engine, there is a recess, *m*, the area of which corresponds to the exposed side area of the chamber H or H', and from which chamber or chambers high-pressure steam is admitted by a passage or passages, *n*. A similar recess, *p*, is also formed between the outer packing-rings $P^2$ $P^3$, the area of which corresponds to the exposed side area of the chamber K, from which latter to the recess P, low-pressure or expanded steam is admitted by a passage or passages, *q*.

The object of the steam-balance plates is to form a steam-tight joint against the piston at all times and under all pressures, without increase of friction, and without having recourse to a heavy spring-pressure to make tight the packing; in fact, a perfect balance can by these means be established, and the friction reduced to a mere nominal degree, only light springs, if necessary, being inserted to act upon the back of the balance-plates O O'. The object of the steam-tight packing-rings circumscribing the recesses *m p* is to prevent the high-pressure steam from escaping from its allotted chamber or recess into that of the low-pressure or expanded steam.

The packings $h$ $h'$ in the radial slides may be forced out by intermediate springs, and an upper spring-borne packing, S, be provided the stationary cylinder A at its top, to make tight the outer periphery of the piston or cylinder G in the upper portion of its travel, all as represented in the accompanying drawings.

What I here claim, and desire to secure by Letters Patent, is—

1. The combination, with a rotating piston made up of radial slides, and occupying an eccentric position relatively to the outer case, of separate inner and outer steam-cylinders or chambers, when the one of said cylinders serves to use the steam expansively from the other in such manner as that the radial slides which form a piston or pistons common to both, are acted upon by high-pressure steam at a short leverage, and by the expanded steam at a longer leverage, and lateral pressure on the main shaft, reduced or counteracted by the live or high-pressure and expanded steam conjointly, substantially as specified.

2. The arrangement, relatively to the inner and outer steam-cylinders or chambers and rotating piston common to both, of the several inlets and outlets for, without extra mechanism, and by the action of the radial slides composing the piston, the admission of high-pressure steam to the inner cylinder or cylinders and passage therefrom, after performance of its duty, to the outer cylinder or chamber, to work expansively in the latter on said piston, and in due course discharge therefrom, essentially as herein set forth.

3. The arrangement, substantially as herein described, of the revolving piston, with its radial slides, inner and outer steam-cylinders, and exhaust-port in the outer cylinder to the condenser, for preventing the high-pressure cylinder and greater portion of the low-pressure one from being cooled by the condenser, essentially as specified.

4. The steam-balance plates I and O, or I' O', the one of them (O or O') being stationary and connected with the outer cylinder, and the other (I or I') rotating with the piston, and both serving to pack the edges of the radial slides and to relieve the piston of friction, essentially as herein set forth.

5. In combination with the steam-balance plates O O', the packing-rings P $P^1$ $P^2$ $P^3$, and recesses $m$ $p$, communicating with the high and low-pressure cylinders of the engine, substantially as described.

FRED. ORTLIEB.

Witnesses:
HENRY T. BROWN,
J. W. COOMBS,
A. LE CLERC.